(12) United States Patent
Tarnow et al.

(10) Patent No.: US 8,237,384 B2
(45) Date of Patent: Aug. 7, 2012

(54) DYNAMIC BRAKING CIRCUIT FOR A HYBRID LOCOMOTIVE

(75) Inventors: Andrew C. Tarnow, Cambridge Springs, PA (US); Frank Wegner Donnelly, North Vancouver (CA); Ronald B. Bailey, North East, PA (US); Kris Redinger, Erie, PA (US)

(73) Assignee: Railpower, LLC, Nicholasville, KY (US)

( * ) Notice: Subject to any disclaimer, the term of this patent is extended or adjusted under 35 U.S.C. 154(b) by 817 days.

(21) Appl. No.: 12/297,564

(22) PCT Filed: Apr. 19, 2007

(86) PCT No.: PCT/CA2007/000670
§ 371 (c)(1),
(2), (4) Date: Mar. 13, 2009

(87) PCT Pub. No.: WO2007/118336
PCT Pub. Date: Oct. 25, 2007

(65) Prior Publication Data
US 2009/0295315 A1 Dec. 3, 2009

Related U.S. Application Data

(60) Provisional application No. 60/745,153, filed on Apr. 19, 2006.

(51) Int. Cl.
*H02P 3/00* (2006.01)
(52) U.S. Cl. ......... 318/375; 318/362; 318/379; 318/380
(58) Field of Classification Search .................. 318/362, 318/375, 379, 380
See application file for complete search history.

(56) References Cited

U.S. PATENT DOCUMENTS

| | | | | |
|---|---|---|---|---|
| 3,803,465 | A | * | 4/1974 | Akamatsu ........................ 318/95 |
| 4,092,571 | A | * | 5/1978 | Hopkins et al. ............... 318/106 |
| 4,284,936 | A | | 8/1981 | Bailey et al. |
| 4,427,928 | A | | 1/1984 | Kuriyama et al. |
| 4,549,119 | A | * | 10/1985 | Slagle ............................ 318/111 |
| 5,644,112 | A | * | 7/1997 | Geiger et al. .................. 200/1 R |
| 5,859,509 | A | * | 1/1999 | Bienz et al. .................... 318/139 |
| 5,992,950 | A | | 11/1999 | Kumar et al. |
| 6,027,181 | A | | 2/2000 | Lewis et al. |
| 6,028,404 | A | * | 2/2000 | Yang ............................. 318/111 |
| 6,104,155 | A | * | 8/2000 | Rosa ............................. 318/381 |
| 6,998,804 | B2 | * | 2/2006 | Meyer et al. ................... 318/362 |
| 7,064,507 | B2 | * | 6/2006 | Donnelly et al. ............. 318/376 |
| 7,084,602 | B2 | * | 8/2006 | Donnelly et al. ............. 318/807 |
| 7,304,445 | B2 | | 12/2007 | Donnelly |
| 7,379,797 | B2 | * | 5/2008 | Nasr et al. ....................... 701/22 |
| 2003/0052627 | A1 | * | 3/2003 | Raimondi ..................... 318/107 |
| 2004/0130282 | A1 | * | 7/2004 | Meyer et al. ................... 318/362 |
| 2005/0024001 | A1 | * | 2/2005 | Donnelly et al. ............... 318/66 |
| 2005/0045058 | A1 | * | 3/2005 | Donnelly et al. .......... 105/26.05 |
| 2006/0061307 | A1 | * | 3/2006 | Donnelly ..................... 318/108 |
| 2006/0076171 | A1 | | 4/2006 | Donnelly et al. |

FOREIGN PATENT DOCUMENTS

WO WO 2005030550 A1 * 4/2005
WO WO 2006/020587 A3 2/2006

* cited by examiner

*Primary Examiner* — Bentsu Ro
*Assistant Examiner* — Kawing Chan
(74) *Attorney, Agent, or Firm* — King & Schickli, PLLC (57) ABSTRACT

Methods of dynamic braking include two embodiments with braking circuits for vehicles such as, for example, locomotives which are operable down to very low speeds. These circuits can provide a braking force even at zero locomotive speed.

29 Claims, 6 Drawing Sheets

DYNAMIC BRAKING CIRCUIT FOR A HYBRID LOCOMOTIVE

CROSS REFERENCE TO RELATED APPLICATION

This application is a National Stage Application of PCT/CA2007/000670, filed Apr. 19, 2007, which claims benefit of Ser. No. 60/745,153, filed Apr. 19, 2006 and which applications are incorporated herein by reference. To the extent appropriate, a claim of priority is made to each of the above disclosed applications.

FIELD

The present invention relates generally to a method for configuring dynamic braking circuits for a locomotive which are operable down to very low speeds.

BACKGROUND

Railroad locomotives typically use a pneumatic braking system controlled by an independent brake (that is separate from the train brakes). The locomotive may include a dynamic braking system whereby the traction motors are reversed so that they generate braking power which is commonly dissipated in a large resistive grid on the locomotive.

U.S. Pat. No. 6,027,181 discloses a system for a locomotive which includes a blended braking system combining a pneumatic braking system for the train with a dynamic braking system on the locomotive.

The present inventors have disclosed a system for controlling a dynamic and regenerative braking system for a hybrid locomotive which employs a control strategy for orchestrating the flow of power amongst the prime mover, the energy storage system and the regenerative braking system in a U.S. Patent Application Publication Number 2006-0076171 filed Aug. 9, 2005 entitled "Regenerative Braking Methods for a Hybrid Locomotive" which is also incorporated herein by reference."

As presented in U.S. Patent Application Publication Number 2006-0076171, the concept was to recover energy from the traction motors to either dissipate this power in resistive grids (dynamic braking) and/or feed this power into a DC bus if the DC bus is equipped with any means of energy storage, such as for example, a battery pack, a capacitor bank and/or a flywheel system. As shown in FIG. 23 of U.S. Patent Application Publication Number 2006-0076171, the proposed method consists in reversing the power flow of the armature and field windings in series to switch from the motoring to braking mode. In this configuration with both windings in series, it may be difficult to control the power drawn from the traction motors in braking mode.

In U.S. patent application Ser. No. 11/200,881 filed Aug. 9, 2005 entitled "Locomotive Power Train Architecture", Donnelly et al. have further disclosed a general electrical architecture for locomotives based on a plurality of power sources, fuel and drive train combinations. The power sources may be any combination of engines, energy storage and regenerative braking. This application is also incorporated herein by reference.

In rail yard switching operations, for example, a locomotive may be operated primarily at low speed (speeds less than about 15 mph) with multiple stop and starts. In these situations, the braking system is worked hard and is a high maintenance system on the locomotive. Further, if the brake system locks up, it can cause wheel skid which can result in flat spots developing on the skidding wheels. Flat spots are a further costly high maintenance operation usually requiring wheel replacement.

There thus remains a need for a locomotive braking system that can be used in conjunction with or instead of a mechanical or pneumatic locomotive braking system, that is particularly suited for operations at low speed.

These and other needs are addressed by the various embodiments and configurations of the present invention which are directed generally to utilizing the locomotive's traction motors to return energy from braking to a least one of the locomotive's diesel engines, DC electrical bus, energy storage system or dynamic braking system in a way that minimizes wheel skid and in a way that provides seamless braking action at or near 0 mph.

SUMMARY

These and other advantages will be apparent from the disclosure of the invention(s) contained herein.

The various embodiments and configurations of the present invention are directed generally to a dynamic braking method for a locomotive which minimizes the tendency for wheel skid and can be used preferentially instead of the locomotive's pneumatic or mechanical braking systems. The invention disclosed herein may be used on a conventional diesel-electric locomotive; a multi-engine diesel-electric locomotive, or a hybrid locomotive comprised of one or more engines and one or more energy storage systems. The energy produced during braking can be utilized or discarded. If utilized, it can be stored in an energy storage system such as for example a battery pack or a capacitor bank or it can be used to power the electrical braking control and auxiliary power systems on the locomotive. If discarded, it can be routed to a dissipative resistive grid or can be dissipated by routing it through an alternator, for example, an induction or synchronous alternator, to do work against the locomotive's engine (engine braking).

In a first embodiment, traction motors are connected in parallel for high-speed motoring and high-speed braking. When connected in parallel, the traction motor circuit includes current path to a common DC bus which alternates with a low resistance free-wheeling current path. The traction motor control circuit also comprises first and second pairs of first and second transistors, each of the first and second transistors comprising an input and an output, wherein the first pair of first and second transistors is connected in parallel with the second pair of first and second transistors to the DC bus, wherein in each of the first and second pairs of transistors, the output of the first transistor is connected to the input of the second transistor, and wherein the pair of traction motor circuits is connected between the output of the first transistor of the first pair of transistors and the input of the second transistor of the second pair of transistors. The free-wheeling time is controlled by selecting the duty cycle for a pairing selected among the first and second pairs of transistors, typically IGBTs.

Pairs of traction motors are switched to a series connection configuration for low-speed motoring and low-speed braking. When connected in series, the traction motor circuit includes current path across a common DC bus which alternates with a high resistance free-wheeling current path also through the DC bus. The free-wheeling time is controlled by selecting the duty cycle for a pair of IGBTs and the free-wheeling current is prevented from a runaway buildup by the voltage on the DC bus. It is possible, for example, to include only the low-speed circuit for a yard switching locomotive, where operation is commonly less than about 15 mph.

During low speed dynamic braking, the circuit provides current through the motor field every cycle. During low speed motoring, the same IGBTs are controlled and the direction of current through the armature remains unchanged. Only the reverser position is changed to switch between low speed motoring and low speed dynamic braking. This allows for motoring through zero speed with the same configuration as dynamic braking through zero speed. By doing this, there are no contactors to set up when going from dynamic braking to motoring. With no contactors setup, the independent locomotive pneumatic brake can be blended, when necessary, with the dynamic braking without any loss of response.

In low speed braking mode, there is always current flowing through the traction motor armature and field coil so that, even at zero speed, there is a braking force that will resist further motion.

The circuit of the first embodiment can become unstable in certain circumstances since the field and armature coils are in series. This can be overcome, for example, by using well-known analogue control methods or very fast-acting digital control methods.

In a second embodiment, a zero or low resistance bypass can be added across the field coils of the circuits of the first embodiment to control potential instabilities arising from the field and armature windings connected electrically in series such that they create a positive feedback condition and can, in some circumstances, cause a runaway current build-up if not properly controlled. An IGBT is used to control the shunt resistor connected across each field coil when two traction motors are operated in a series configuration. This allows independent control of traction motor torque for low speed motoring or dynamic braking and is useful for eliminating non-synchronous wheel slip during motoring or dynamic braking (i.e. when only one of the wheel sets is slipping).

By utilizing the dynamic braking circuit configurations described above during low-speed braking, the possibility of wheel skid such as can occur when pneumatic brakes lock-up can be effectively eliminated. This, in turn, prevents flat spots from developing on the locomotive wheels. Thus, the two embodiments of the present invention have the advantage of substantially reducing locomotive downtime and maintenance which are significant problems, for example, in yard switching operations. For example, multiple locomotives have been used in yard switching operations involving long trains to minimize wheel skid occurrences and pneumatic brake maintenance when only the locomotives' independent braking systems are used. This is a wasteful practice since the multiple locomotives can generate far more power, produce more emissions and consume far more fuel than required. When the dynamic braking methods of the present invention are used, the independent pneumatic brakes of the locomotive need only be used in heavy braking or emergency braking situations. This practice will substantially eliminate occurrences of wheel skid most typically associated with pneumatic brake systems. Thus locomotive brake maintenance problems can be minimized while using only one locomotive with concomitant savings in fuel costs and reduction of emissions.

As can be appreciated, the methods of dynamic braking disclosed herein can be blended with the locomotive's independent brake system for example in switch yard work where speeds often are low and there are frequent starts and stops. The method of dynamic braking can also be blended with the train's automatic brake system for example in road switchers and/or passenger trains where speeds are often high.

The above-described embodiments and configurations are neither complete nor exhaustive. As will be appreciated, other embodiments of the invention are possible utilizing, alone or in combination, one or more of the features set forth above or described in detail below.

The following definitions are used herein:

A locomotive is generally a self-propelled railroad prime mover which is powered either by a steam engine, diesel engine or externally such as from an overhead electrical catenary or an electrical third rail.

A traction motor is a motor used primarily for propulsion such as commonly used in a locomotive. Examples are an AC or DC induction motor, a permanent magnet motor and a switched reluctance motor.

An engine refers to any device that uses energy to develop mechanical power, such as motion in some other machine. Examples are diesel engines, gas turbine engines, microturbines, Stirling engines and spark ignition engines A prime power source refers to any device that uses energy to develop mechanical or electrical power, such as motion in some other machine. Examples are diesel engines, gas turbine engines, microturbines, Stirling engines, spark ignition engines or fuel cells.

An en energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a compressed air storage system and a bank of flywheels.

Dynamic braking is implemented when the electric propulsion motors are switched to generator mode during braking to augment the braking force. The electrical energy generated is typically dissipated in a resistance grid system.

Regenerative braking is the same as dynamic braking except the electrical energy generated is recaptured and stored in an energy storage system for future use.

The independent brake is typically the pneumatic brake system on a locomotive.

The automatic brake is typically the pneumatic brake system for a train and usually includes the locomotive's pneumatic brake system.

A blended brake system is a combination of brake systems such as the combination of the dynamic and independent brakes on a locomotive or the dynamic and automatic brake systems on a train.

An electrical energy converter refers to an apparatus that converts mechanical energy to electrical energy. Examples include various types of alternators, alternator-rectifier combinations and generators.

A power control apparatus refers to an electrical apparatus that regulates, modulates or modifies AC or DC electrical power. Examples are an inverter, a chopper circuit, a boost circuit, a buck circuit or a buck/boost circuit.

An IGBT is Insulated Gate Bipolar Transistor which is a power switching device capable of sequentially chopping a voltage waveform at a very fast rate.

Locomotive speed is the speed of the locomotive along the tracks and is typically expressed in miles per hour or kilometers per hour.

Engine speed is the rotary speed of the engine output drive shaft and is typically expressed in rpms.

Alternator speed is the rotary speed of the alternator rotor and is typically expressed in rpms. The alternator speed is commonly the same as engine speed since they are usually directly connected with no intermediate gearing.

Traction mode is the same as motoring mode where the vehicle is accelerating or maintaining speed.

Braking mode is where the vehicle is decelerating under application of at least one braking system.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 1 is a circuit diagram illustrating the circuit of the present invention in high speed motoring mode.

FIG. 2 is a circuit diagram illustrating the circuit of the present invention in low speed motoring mode.

FIG. 3 is a circuit diagram illustrating the circuit of the present invention in high speed braking mode.

FIG. 4 is a circuit diagram illustrating the circuit of the present invention in low speed braking mode.

FIG. 5 is a circuit diagram illustrating the circuit of the present invention in low speed motoring mode with independent control of the field coil shunt resistor.

FIG. 6 is a circuit diagram illustrating the circuit of the present invention in low speed braking mode with independent control of the field coil by a shunt resistor.

DETAILED DESCRIPTION

High and Low Speed Dynamic Braking Circuit Approach

The method of locomotive braking disclosed herein provides a seamless dynamic braking action at low speeds down to 0 mph and even at 0 mph provides a resistive torque that can prevent rollback. Typically on a train, a brake pipe is blended with the locomotive's independent brake using the automatic brake control. The brake pipe is the line that goes to all of the cars in the train and is used for long, over the road operation. In the switch yard, the brake pipe is often not connected to the train from the locomotive as it takes time to charge the train's air system. Often, only the locomotive's independent brake is the only braking system used in switch yard operations.

Blended braking is an existing concept for a locomotive which combines the locomotive's independent air brake with some dynamic braking. The method of locomotive braking disclosed herein is more properly called preferential braking since, for most operations, only the dynamic braking system is used at low speeds, with the locomotive's pneumatic braking system used only during very heavy braking or in emergency braking situations.

The principal advantages of the locomotive braking method disclosed herein are:
- the braking system works effectively at low speeds. Conventional dynamic braking does not work effectively at low speeds for either AC or DC locomotives, although a boost circuit can be used to raise the voltage from the motor terminal volts to a higher voltage.
- the braking system substantially reduces the likelihood of wheel skid and the flat spots that can develop during skid.
- the braking system can be blended with the locomotive's independent brake in a way that is transparent to the operator.
- the dynamic braking system disclosed herein uses a minimum of power switching components.
- this method of dynamic braking allows the engineer to apply brakes more aggressively since the likelihood of wheel skid is substantially reduced.

Figure 1A:
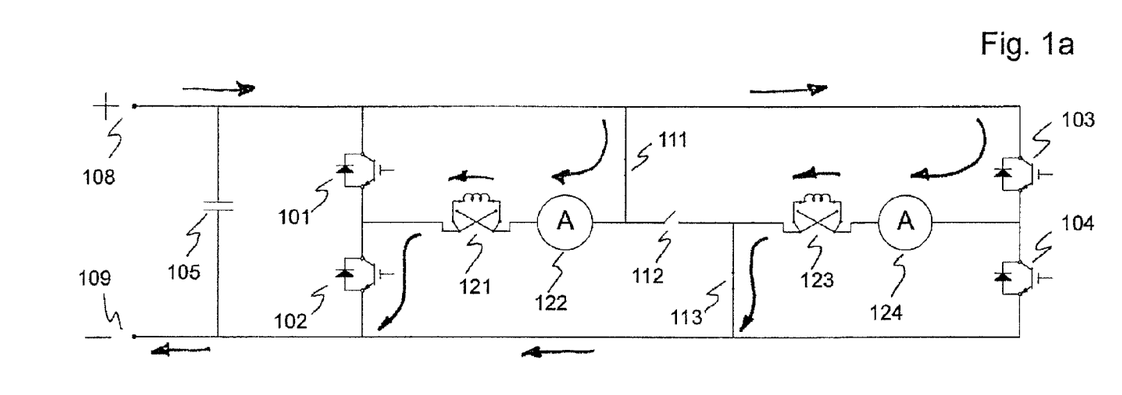
Figure 1B:
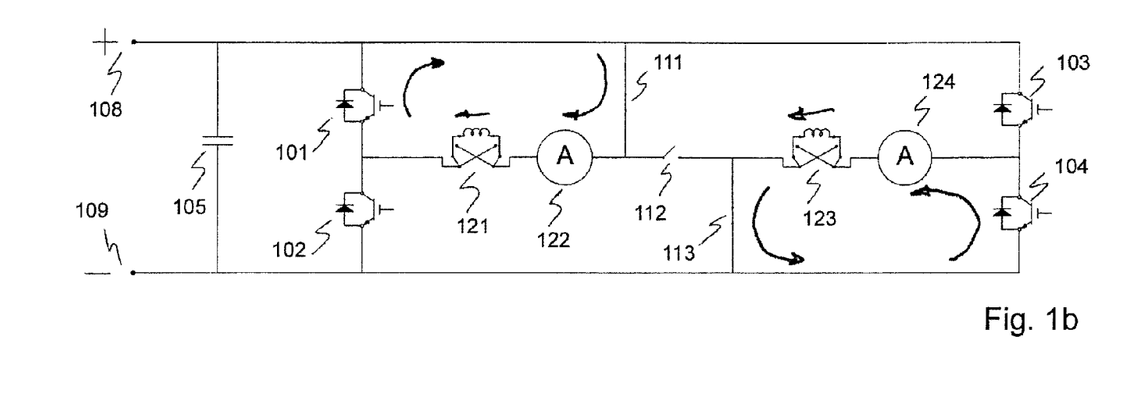

FIG. 1 is a circuit diagram illustrating the circuit of the present invention in high speed motoring mode. High speed is considered in the range of about 15 mph and higher. The circuit is comprised of an electrically positive terminal 108 and an electrically negative terminal 109 which are connections to a DC bus (not shown). A capacitor 105 is also shown. The capacitor 105 provides filtering action and can also store significant energy during switching between the various modes. For example, the capacitor 105 should be able to store an amount of energy comparable to that stored inductively in the motor windings and therefore can limit the voltage developed across the IGBTs as well as absorb switching voltage transients. As can be appreciated, electrical energy can flow to or from the DC bus, depending on the voltage across the DC bus and the voltage across the traction motors. In high speed motoring configuration, switches 111 and 113 are closed and conducting while switch 112 is open and non-conducting. In high speed motoring, electrical energy flows from the positive terminal 108 and through the two traction motors connected in parallel. In FIG. 1a, IGBTs 102 and 103 are conducting while IGBTs 101 and 104 are non-conducting. Current flows through armature coils 122 and 124 and their respective field coils 121 and 123 as shown by current flow arrows and propulsive power is developed by the traction motors. Field coils 121 and 123 are connected by reverser contacts which control the direction of current flow through the traction motor field coils. In forward motoring, by convention used herein, current flow arrows through the field coils are in the same direction as the armature current flow arrows. In FIG. 1b, IGBTs 102 and 103 are switched off (non-conducting) while IGBTs 101 and 104 remain non-conducting. In this configuration the currents in the traction motors are free wheeling, with the by-pass diodes of IGBTs 101 and 104 serving as the free-wheeling diodes. During the free wheeling portion of the duty cycle, current flows through the traction motors but no propulsive power is developed. The duty cycle of IGBTs 102 and 103 (which are the same) therefore controls the average propulsive power flowing from the DC bus to the traction motors.

Figure 2A:
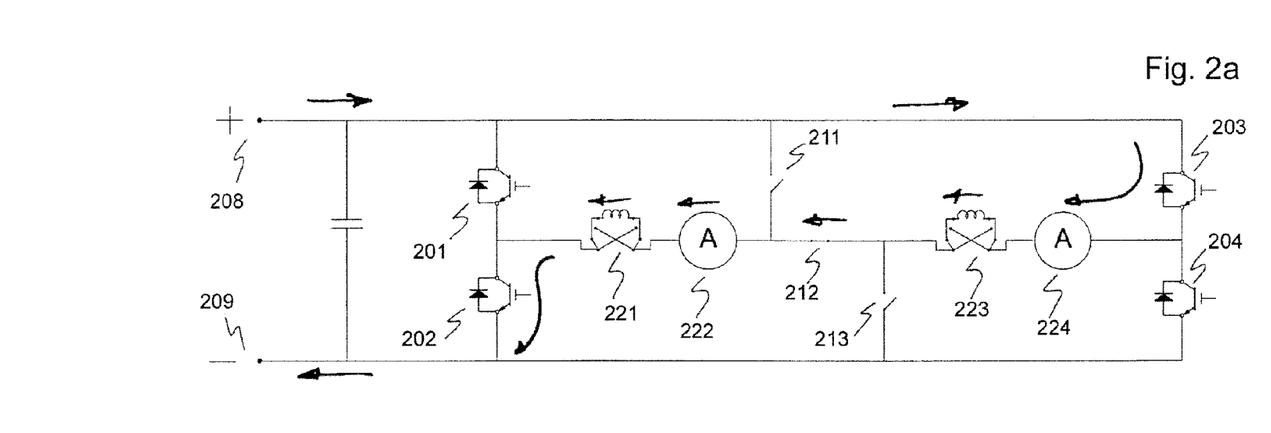
Figure 2B:
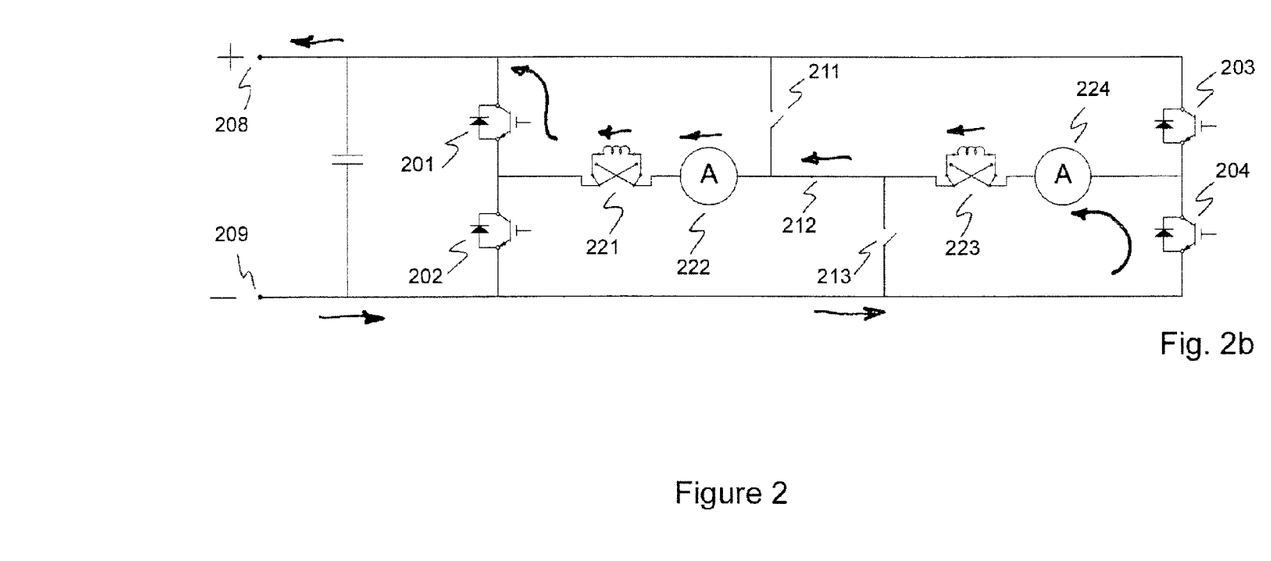

FIG. 2 is a circuit diagram illustrating the circuit of the present invention in low speed motoring mode (about 15 mph or less). The circuit is comprised of an electrically positive terminal 208 and an electrically negative terminal 209 which are connections to a DC bus (not shown). In low speed motoring configuration, switches 211 and 213 are open and non-conducting while switch 212 is closed and conducting. In low speed motoring, electrical energy flows from the positive terminal 208 and through the two traction motors now connected in series. In FIG. 2a, IGBTs 202 and 203 are conducting while IGBTs 201 and 204 are non-conducting. Current flows through armature coils 222 and 224 and their respective field coils 221 and 223 as shown by current flow arrows and propulsive power is developed by the traction motors. Field coils 221 and 223 are connected by reverser contacts which control the direction of current flow through the field coils. In FIG. 2b, IGBT 202 and 203 are switched off (non-conducting), IGBTs 201 and 204 remain non-conducting. In this configuration, the motors are free wheeling, with the by-pass diodes of IGBTs 201 and 204 serving as a free-wheeling diodes. The free wheeling path includes circulation through the DC bus. In low speed free-wheeling the combined back emf of the two-series connected armatures is sufficiently high to overcome the DC bus voltage so that the free-wheeling current continues to flow. The current path through the DC bus requires a path that may be completed by an auxiliary load, a dynamic breaking grid and/or an energy storage system. During the free wheeling portion of the duty cycle, current flows through the traction motors but no propulsive power is developed. The duty cycle of IGBTs 202 and 203 (which are the same) therefore control the average propulsive power from the DC bus to the traction motors. IGBTs 201 and 204 are switched off when IGBTs 202 and 203 are on, and IGBTs 201 and 204 are switched on when IGBTs 202 and 203 are off. By using the DC bus as part of the free-wheeling path during the energy build-up phase of low speed motoring, the tendency of the current to build-up too rapidly or too high is eliminated.

Figure 3A:
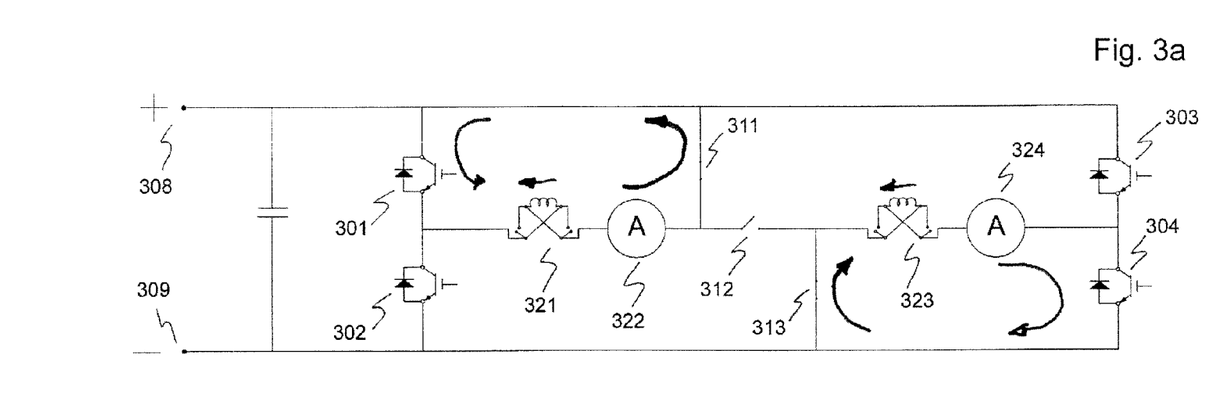
Figure 3B:
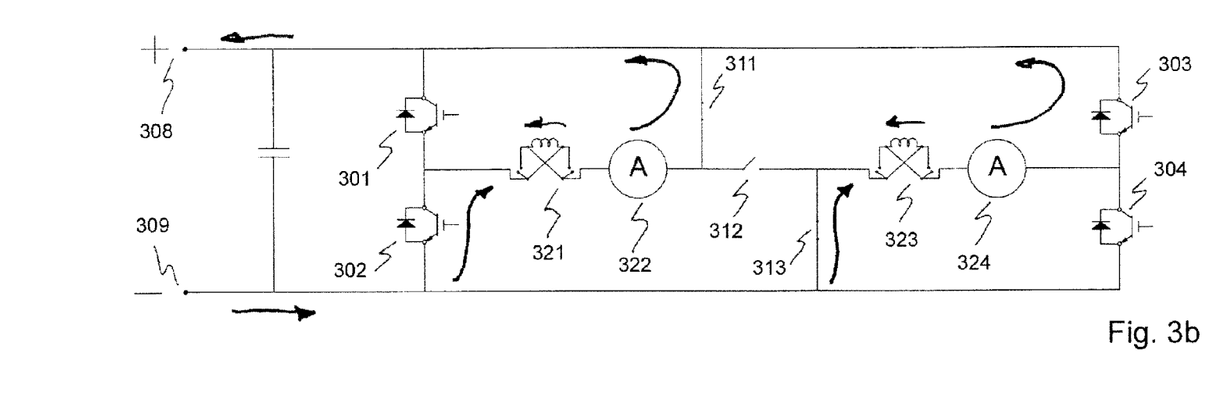

FIG. 3 is a circuit diagram illustrating the circuit of the present invention in high speed braking mode and is suitable for dynamic braking or regenerative braking methods. The circuit is comprised of an electrically positive terminal 308 and an electrically negative terminal 309 which are connections to a DC bus (not shown). In high speed braking configuration, switches 311 and 313 are closed and conducting while switch 312 is open and non-conducting. The two traction motors are shown connected in parallel across the DC bus terminals 308 and 309. In high speed braking, electrical energy flows intermittently from the negative terminal 309 to the positive terminal 308, thus returning energy to the DC bus (not shown). In FIG. 3a, IGBTs 301 and 304 are conducting while IGBTs 302 and 303 are non-conducting. Current flows through armature coils 322 and 324 and their respective field coils 321 and 323 as shown by current flow arrows. Field coils 321 and 323 are connected by reverser contacts which control the direction of current flow through the traction motor field coils. In forward braking, by convention used herein, current flow arrows through the field coils are in the opposite direction as the armature current flow arrows as the reverser contacts have been switched from motoring. The current increases and magnetic energy is built up and stored in the armature windings. In FIG. 3b, IGBTs 301 and 304 are switched off (non-conducting) while IGBTs 302 and 303 remain off. The current flow is through the by-pass diodes of IGBTs 302 and 303. In this configuration the energy stored in the traction motors reaches a voltage level higher than that on the DC bus and is released. Current flows back to the positive terminal 308 of the DC bus and energy is returned to the DC bus. By modulating the current, the duty cycles of IGBTs 301 and 304 (which are the same) control the maximum voltage level and power flow from the traction motors to the DC bus as well as controlling the braking force applied by the traction motors.

Figure 4A:
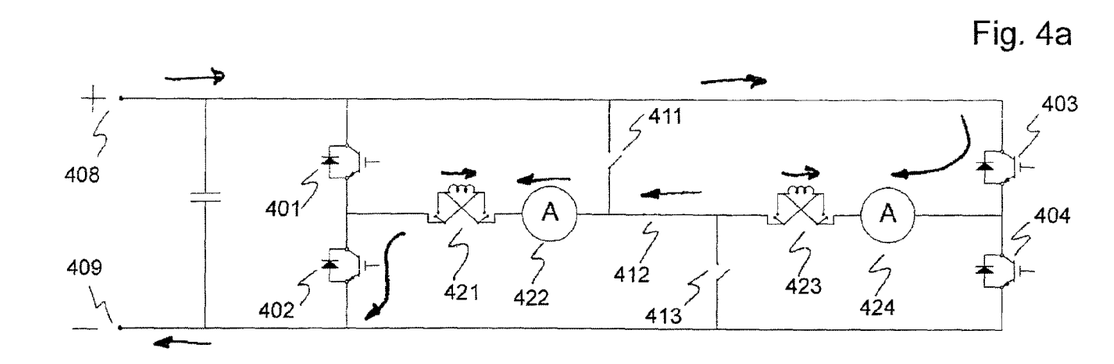
Figure 4B:
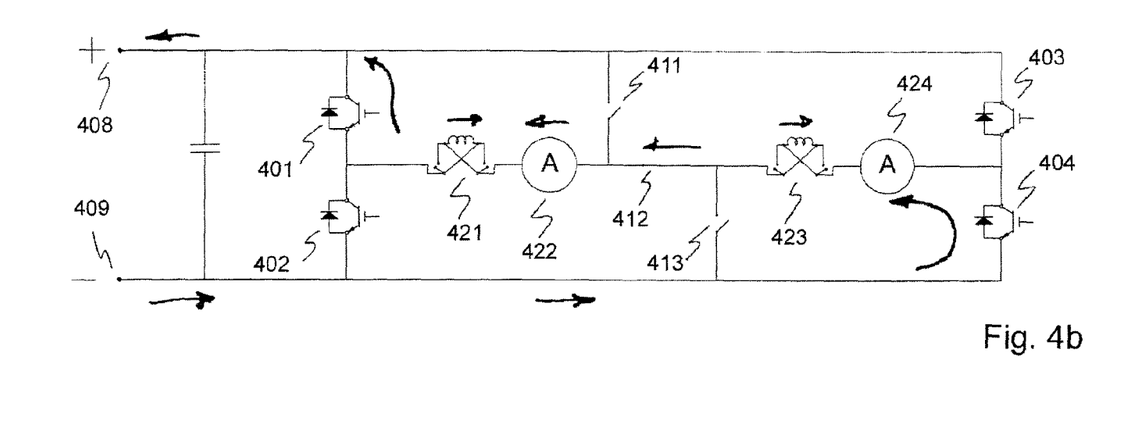

FIG. 4 is a circuit diagram illustrating the circuit of the present invention in low speed braking mode and is suitable for dynamic braking or regenerative braking methods. The circuit is comprised of an electrically positive terminal 408 and an electrically negative terminal 409 which are connections to a DC bus (not shown). In low speed braking configuration, switches 411 and 413 are open and non-conducting while switch 412 is closed and conducting. The two traction motors are now shown connected in series. In low speed braking, electrical energy flows intermittently back and forth between the negative terminal 409 and the positive terminal 408, but returns a net energy to the DC bus (not shown). In FIG. 4a, IGBTs 402 and 403 are conducting while IGBTs 401 and 404 are non-conducting. Current flows through armature coils 422 and 424 and their respective field coils 421 and 423 as shown by current flow arrows. Field coils 421 and 423 are connected by reverser contacts which control the direction of current flow through the traction motor field coils. In forward braking, by convention used herein, current flow arrows through the field coils are in the opposite direction as the armature current flow arrows as the reverser contacts have been switched from motoring. The free wheeling path includes circulation through the DC bus. In low speed freewheeling, the combined back emf of the two-series connected armatures is augmented by the DC bus voltage so that the free-wheeling current rises rapidly and magnetic energy is built up and stored in the armature windings. The current path through the DC bus requires a path that may be completed by an auxiliary load, a dynamic braking grid and/or an energy storage system. In FIG. 4b, IGBTs 402 and 403 are switched off (non-conducting) while IGBTs 401 and 404 remain off. Current flows through the by-pass diodes of IGBTs 401 and 404. In this configuration the energy stored in the traction motors reaches a voltage level higher than that on the DC bus and is released and flows back to the positive terminal 408 of the DC bus. By modulating the current, the duty cycle of IGBTs 402 and 403 (which are the same) control the voltage level and power flow from the traction motors to the DC bus as well as controlling the braking force applied to the traction motors during low speed braking. By using the DC bus as part of the fi-ee-wheeling path during the energy build-up phase of braking, the tendency of the current to build-up too rapidly or too high is eliminated.

For low speed dynamic braking, the two diagonal IGBTs (as shown in FIG. 4) are turned on at once for the buildup portion of the duty cycle and off for the free wheeling portion of the duty cycle. In the freewheeling mode, the diodes on the opposite corners of the IGBTs conduct. By turning on the diagonal IGBTs, a current flows through the motor field coils every cycle. For low speed motoring, the same IGBTs are controlled and the direction of current through the armature remains unchanged. Only the reverser position is changed. This allows for motoring through zero speed with the same configuration as dynamic braking through zero speed. By doing this, there are no contactors to setup when going from dynamic braking to motoring. With no contactors setup, the locomotive's pneumatic brake can be blended, when required, without any loss of response.

In a switch yard, the reverser can have its direction changed while the locomotive is in idle notch and the locomotive can then be notched up at low speed without fear of plugging (that is, without fear of unwanted current build-up which can result in damage or burn out of the IGBT's free-wheeling diodes).

An additional benefit of operating in such a mode for motoring is that if there is a direction change, the locomotive can travel through zero speed and go the other way without coordinating the contactor positions with direction of travel. This reduces the chance of 'plugging' through a diode and losing control and burning out the diode as could happen if the high speed motoring configuration is used with a reverser not set to match the direction of rotation.

As can be appreciated, the method of dynamic braking disclosed herein can be blended with the locomotive's independent brake system for example in switch yard work where speeds often are low and there are frequent starts and stops. The method of dynamic braking can also be blended with the train's automatic brake system for example in road switchers and/or passenger trains where speeds are often high.

High and Low Speed Dynamic Braking Circuit Approach with Independent Field Control When in low speed motoring or braking mode, two traction motors are connected in series. It therefore becomes possible for wheel slip to occur on one of the wheel sets but not on the other controlled by the two traction motors. Such non-synchronous wheel slip can be detected as follows. The speeds of the two traction motors (or axles which the traction motors typically drive via a fixed gear ratio linkage) can be measured.

Any substantial difference in wheel speeds between the two wheel sets is a direct indication of wheel slip. Examples of rotary speed sensors include tachometers such as axle alternators or reluctance pickups on the bull gear.

Alternately the speeds of the two traction motors can be estimated by measuring the motor volts across each of the series-connected motors and evaluating the voltage difference between the two measured motor volts. Typically the motor volts are within about 5% of each other during normal operation. When the motor volts across one of the traction motors increases rapidly during motoring, it is an indication of wheel slippage by the wheels controlled by that traction motor. Both direct measurement and estimating methods are well-known locomotive techniques for detecting the occurrence of wheel slip.

In an embodiment of the present invention, a switch such as an IGBT is connected in series with the field coil shunt resistor of each traction motor. This IGBT allows some of the motor current to by-pass the field coil when a slip condition is detected, so as to reduce the torque applied to the wheels associated with that traction motor. That is, if one set of wheels is determined to be slipping, then the speed of the traction motor for which wheel slip is occurring can be controlled by a desired adjustment of the field coil of that traction motor by controlling the duty cycle of the IGBT.

FIG. 5 is a circuit diagram illustrating the circuit of the present invention in low speed motoring mode with independent control of the field coil shunt resistor. This figure is similar to that of FIG. 3 but shows a shunt resistor and IGBT in parallel with the field coil of each traction motor. Typically, a shunt resistor and switch in parallel with the field coil of each traction motor are used at higher locomotive speeds to reduce the back emf of the field coil so as to provide more current to the armature when the back emf approaches the level of the total motor volts.

IGBT s 504 and 514 can be operated with duty cycles ranging from 0% to 100% and so can be used to control the current through the field coils as is well known for higher locomotive speeds. As used in the present invention, these IGBTs can also be used to control non-synchronous wheel slip at low speeds by prescribing a selected duty cycle between 0% and 100%.

Figure 5A:
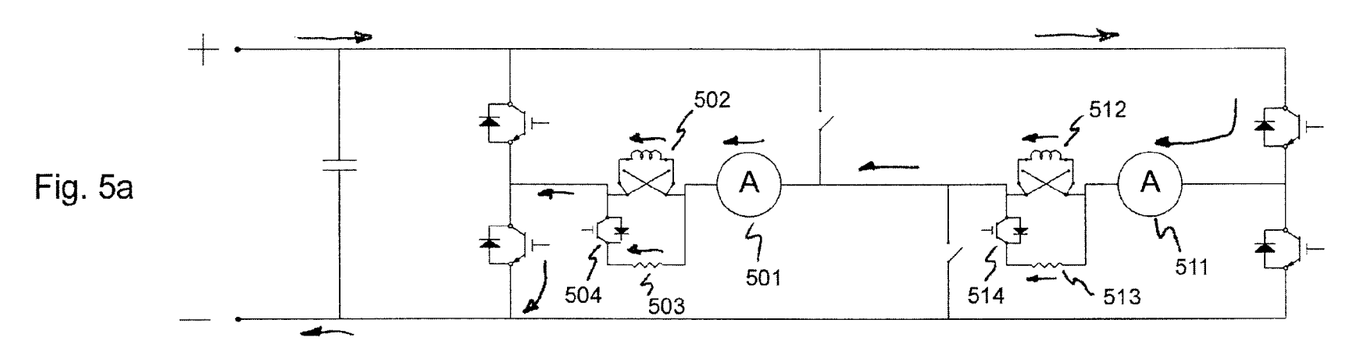
Figure 5B:
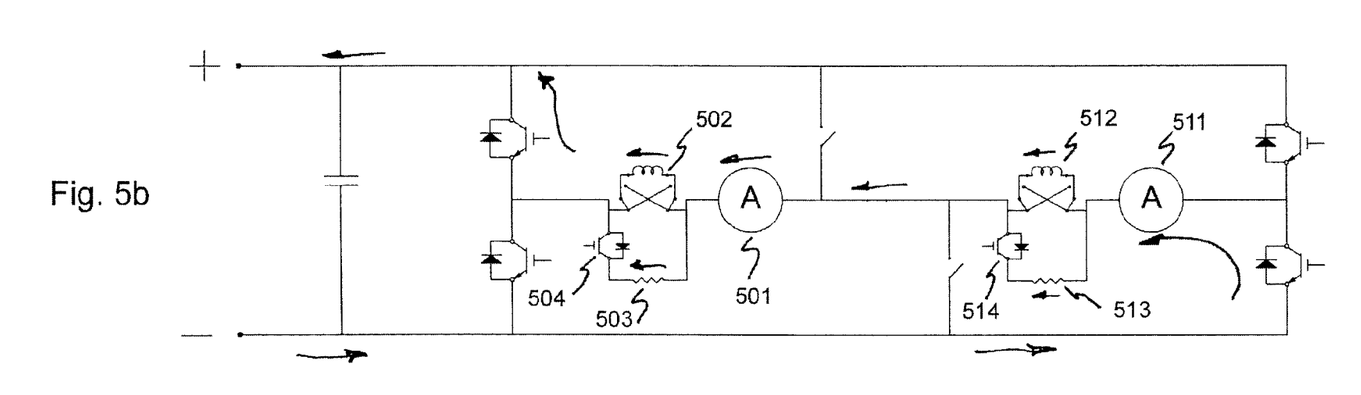

The arrows depicting current flow are the same as those shown in FIG. 3. In FIG. 5, the wheels associated with traction motor 511 have been detected to be slipping. IGBT 514 is operated with a selected duty cycle to allow some current through the shunt resistor 513 and thereby reduce the current through field coil 512. At low speeds (about 15 mph or lower), this will reduce the torque applied by traction motor 511. FIG. 5a illustrates the power-on mode of the circuit and FIG. 5b illustrates the free-wheeling mode of the circuit as was described previously in FIG. 2. In FIG. 5, the wheels associated with traction motor 501 have not been detected to be slipping. IGBT 504 remains off and no current is allowed through shunt resistor 503 therefore has no effect on the current in field coil 502.

FIG. 6 is a circuit diagram illustrating the circuit of the present invention in low speed braking mode with independent control of the field coil shunt resistor. This figure is similar to that of FIG. 4 but shows a shunt resistor and IGBT in parallel with the field coil of each traction motor.

IGBT s 604 and 614 can be operated with duty cycles ranging from 0% to 100% and so can be used to control the current through the field coils as is well known for higher locomotive speeds. As used in the present invention, these IGBTs can also be used to control non-synchronous wheel slip at low speeds by prescribing a selected duty cycle between 0% and 100%. Wheel slip at low speeds can occur during dynamic braking if the braking torque applied by one of the two series traction motors is substantially different. Typically, wheel skid will not occur during dynamic braking.

Figure 6A:
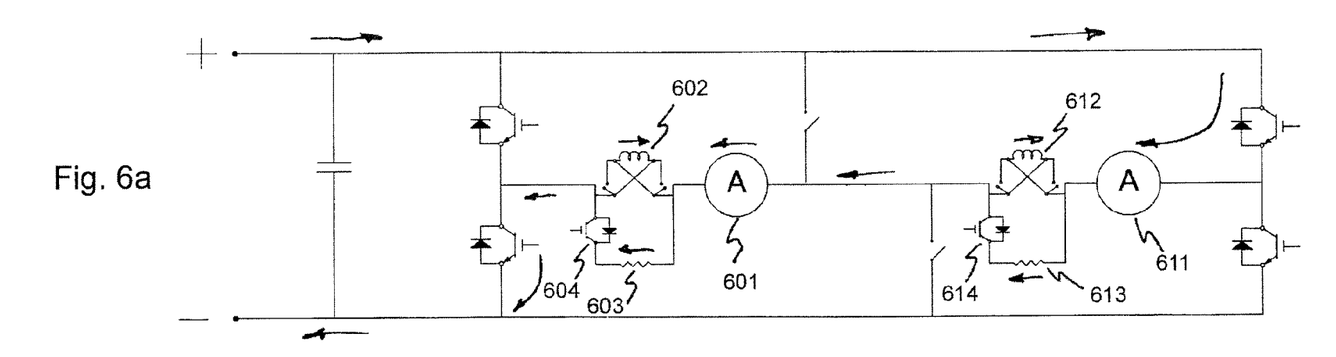
Figure 6B:
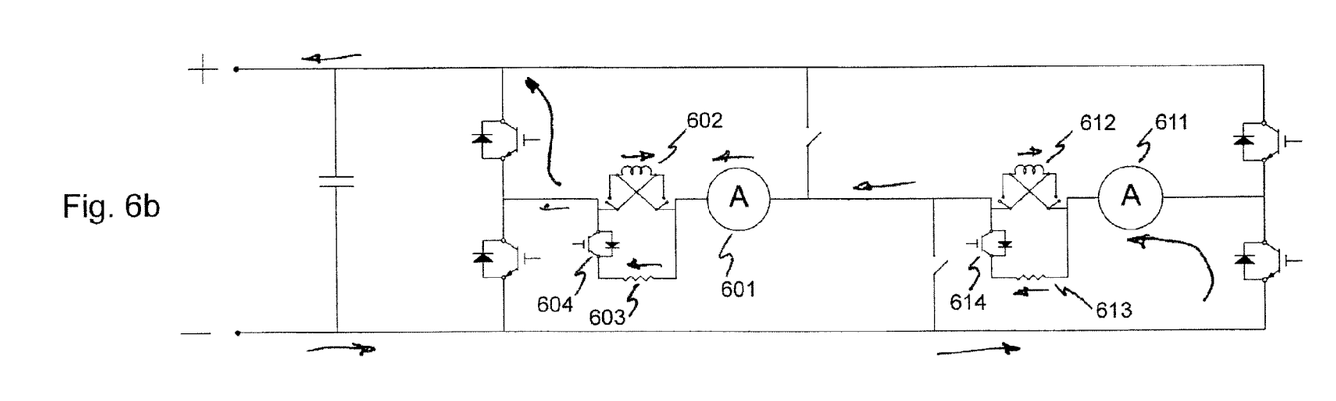

The arrows depicting current flow are the same as those shown in FIG. 5. In FIG. 6, the wheels associated with traction motor 611 have been detected to be slipping. IGBT 614 is operated with a selected duty cycle to allow some current through the shunt resistor 613 and thereby reduce the current through field coil 612. At low speeds (about 15 mph or lower), this will reduce the torque applied by traction motor 611. FIG. 6a illustrates the power-on mode of the circuit and FIG. 6b illustrates the free-wheeling mode of the circuit as was described previously in FIG. 4. In FIG. 6, the wheels associated with traction motor 601 have not been detected to be slipping. IGBT 604 remains off and no current is allowed through shunt resistor 603 therefore has no effect on the current in field coil 602.

A number of variations and modifications of the invention can be used. As will be appreciated, it would be possible to provide for some features of the invention without providing others. For example, in one alternative embodiment, a low speed high-power yard switcher locomotive might use only the low speed circuit of FIGS. 3 and 4 and eliminate switches 311, 312 and 313 in FIG. 3 and switches 411, 412 and 413 in FIG. 4.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of switching a traction motor circuit between motoring and braking a vehicle, the vehicle comprising a pair of traction motors for moving the vehicle and generating electrical energy when the vehicle is decelerating, wherein each said traction motor circuit comprises a field coil and an armature coil, the field and armature coils being connected in series, and wherein each said traction motor circuit comprises a switchable contact reverser operable to switch electrical current in opposite directions of flow through the one of the armature and field coils while maintaining a same flow direction in the other of the armature and field coils; a power source to provide electrical energy to each said traction motor circuit; and a direct current (DC) bus interconnecting each said traction motor circuit and said power source where each traction motor circuit alternates with a free-wheeling current path and free-wheeling time of each traction motor circuit is controlled by selecting a duty cycle for a pair of IGBTs, the method comprising:
   a) connecting said pair of traction motors in series connection for low-speed motoring and low-speed braking;
   b) switching each said contact reverser to switch between low-speed motoring and low-speed braking;
   c) controlling free-wheeling time by selecting the duty cycle for said pair of IGBTs and preventing free-wheeling current buildup by voltage on said DC bus; and
   d) turning two IGBTs on at once for a buildup portion of the duty cycle and off for a free-wheeling portion of the duty cycle.

2. The method of claim 1 wherein in said low-speed braking, current flow through said field coils is in the opposite direction as the current flow in said armatures.

3. The method of claim 1 wherein only the direction of said contact reverser is changed to switch between low speed motoring and low speed dynamic braking.

4. The method of claim 1 wherein a zero or low resistance bypass is added across the field coils of said traction motor circuits to control potential instabilities.

5. The method of claim 4 wherein said low resistance bypass is a shunt resistor connected across each field coil.

6. The method of claim 5 wherein an IGBT is used to control the shunt resistor connected across each field coil when two traction motors are operated in a series configuration.

7. The method of claim 5 wherein the DC bus is connected to an auxiliary load, a dynamic braking grid or an energy storage system.

8. The method of claim 1 wherein said vehicle further comprises an energy storage system to store electrical energy and provide electrical energy to said pair of traction motors; and said power source provides electrical energy to at least one of the energy storage system and at least one traction motor; and said DC bus interconnects the at least one traction motor, energy storage system, and power source.

9. The method of claim 1 wherein said pair of traction motors are also switchably connected in parallel for high-speed motoring and high-speed braking.

10. The method of claim 9, wherein when connected in parallel, each said traction motor circuit is electrically connected to a common DC bus which alternates with a low resistance free-wheeling current path.

11. The method of claim 10 wherein the free-wheeling time is controlled by selecting the duty cycle for a pair of transistors.

12. The method of claim 11 wherein said pair of transistors are IGBTs.

13. The method of claim 1 wherein when connected in series, the traction motor circuit includes a current path across said DC bus which alternates with a high resistance free-wheeling current path through said DC bus.

14. The method of claim 13 wherein the free-wheeling time is controlled by selecting the duty cycle for said pair of IGBTs and the free-wheeling current is prevented from buildup by the voltage on said DC bus.

15. Traction motor circuit for motoring and braking a vehicle, the vehicle comprising a pair of traction motors for moving the vehicle and generating electrical energy when the vehicle is decelerating, wherein each said traction motor circuit comprises a field coil and an armature coil, the field and armature coils being connected in series, and wherein each said traction motor circuit comprises a switchable contact reverser operable to switch electrical energy in opposite directions of flow through the one of the armature and field coils while maintaining a same flow direction in the other of the armature and field coils, means for electrically connecting said traction motor circuit to a power source for providing electrical energy to at least one traction motor; and to a direct current (DC) bus interconnecting the at least one motor and said power source where said at least one motor alternates with a free-wheeling current path and free-wheeling time of said at least one motor is controlled by selecting a duty cycle for a pair of IGBTs; wherein said pair of traction motors is connected in series for low-speed motoring and low-speed braking, and each said contact reverser is reversible to switch between low-speed braking and low-speed motoring and wherein (1) free-wheeling time is controlled by selecting the duty cycle for said pair of IGBTs and the free-wheeling current is prevented from buildup by the voltage on said DC bus and (2) for low speed dynamic braking, two IGBTs are turned on at once for the buildup portion of the duty cycle and off for the free-wheeling portion of the duty cycle.

16. The traction motor circuit of claim 15 wherein in said low-speed braking, current flow through said field coils is in the opposite direction as the current flow in said armatures.

17. The traction motor circuit of claim 15 wherein only the direction of said contact reverser is changed to switch between low speed motoring and low speed dynamic braking.

18. The traction motor circuit of claim 15 wherein a zero or low resistance bypass is added across the field coils of said traction motor circuits to control potential instabilities.

19. The traction motor circuit of claim 18 wherein said low resistance bypass is a shunt resistor connected across each field coil.

20. The traction motor circuit of claim 19 wherein an IGBT is used to control the shunt resistor connected across each field coil when two traction motors are operated in a series configuration.

21. The traction motor circuit of claim 15 wherein the DC bus is connected to an auxiliary load, a dynamic braking grid or an energy storage system.

22. The traction motor circuit of claim 15 wherein said vehicle further comprises an energy storage system to store electrical energy and provide electrical energy to said pair of traction motors; and said power source provides electrical energy to at least one of the energy storage system and at least one traction motor; and said DC bus interconnects the at least one traction motor, energy storage system, and power source.

23. The traction motor circuit of claim 15 wherein said pair of traction motors are also switchably connected in parallel for high-speed motoring and high-speed braking.

24. The traction motor circuit of claim 23, wherein when connected in parallel, each said traction motor circuit is electrically connected to a common DC bus which alternates with a low resistance free-wheeling current path.

25. The traction motor circuit of claim 24 wherein the free-wheeling time is controlled by selecting the duty cycle for a pair of transistors.

26. The traction motor circuit of claim 25 wherein said pair of transistors are IGBTs.

27. The traction motor circuit of claim 15 wherein when connected in series, the traction motor circuit includes a current path across said DC bus which alternates with a high resistance free-wheeling current path through said DC bus.

28. The traction motor circuit of claim 27 wherein the free-wheeling time is controlled by selecting the duty cycle for said pair of IGBTs and the free-wheeling current is prevented from buildup by the voltage on said DC bus.

29. The method of claim 1 including applying motoring or braking force while traveling through zero speed without coordinating said contact reverser with direction of travel.

* * * * *